May 18, 1926.
A. O. KAHLE
1,584,865
FLUID PRESSURE TESTING DEVICE
Filed Jan. 2, 1923
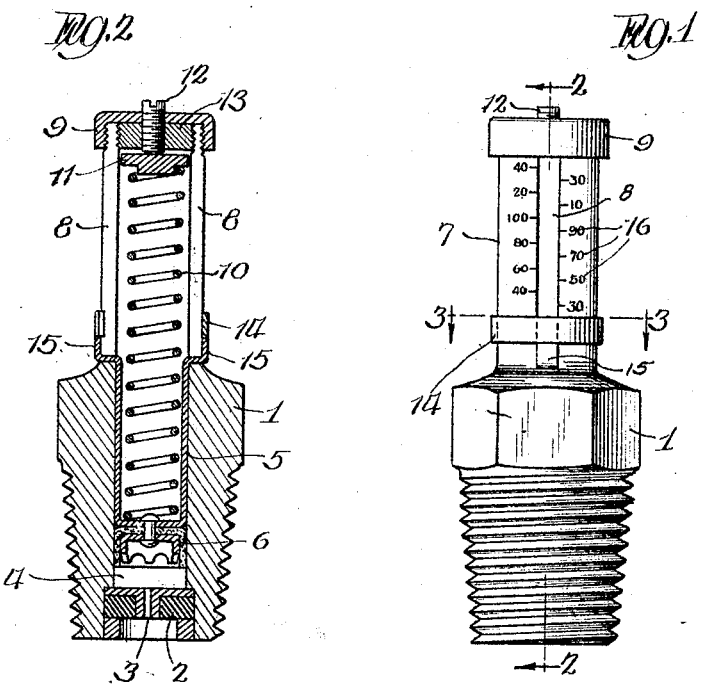
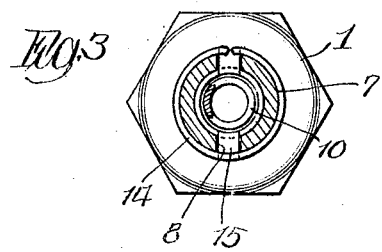
Inventor:
Augustus O. Kahle
by Arthur H. Durand
Atty.

Patented May 18, 1926.

1,584,865

UNITED STATES PATENT OFFICE.

AUGUSTUS O. KAHLE, OF CHICAGO, ILLINOIS, ASSIGNOR OF ONE-HALF TO LEON ROMANSKI, OF CHICAGO, ILLINOIS.

FLUID-PRESSURE-TESTING DEVICE.

Application filed January 2, 1923. Serial No. 610,162.

This invention relates to devices for testing internal combustion engines to show the degree of pressure therein.

Generally stated, the object of the invention is to provide a novel and simple device which can be screwed into the cylinder of the engine, and which is provided with means to accurately register the maximum pressure in the engine, or any cylinder to which the device is attached, as will hereinafter more fully appear.

It is also an object to provide certain details and features of construction and combinations tending to increase the general efficiency and desirability of an internal combustion engine pressure testing device of this particular character.

To these and other useful ends the invention consists in matters hereinafter set forth and claimed and shown in the accompanying drawings in which—

Figure 1 is a side elevation of a pressure testing and indicating device embodying the principles of the invention.

Figure 2 is a vertical section of the said device, on line 2—2 in Figure 1.

Figure 3 is a horizontal section on line 3—3 in Figure 1.

As thus illustrated, the invention comprises a body 1 in the form of a screw threaded plug which can be screwed into the threaded socket ordinarily provided on each cylinder of an internal combination engine. The inner end of said body, or the end which is placed in communication with the cylinder, is provided with a washer 2 having a small opening 3 at the center thereof, so that the fluid pressure in the cylinder may enter through this passage into the bore 4 of said plug. In this bore 4 there is a reciprocating member 5 provided at its lower end with a piston head 6 which smoothly fits the bore, and which is subject to said fluid pressure, whereby said member 5 will be pushed upward by the pressure. The upper portion of the body 1 is formed with a tubular portion 7 having vertical slots 8 at opposite sides thereof, and a screw cap 9 is removably fitted on top of this tubular portion. A coil spring 10 is disposed in the bore 4 of the device, in the manner shown, between the head 6 and the abutment 11 at the top of the device. This abutment 11 is adjustable by means of a screw 12 inserted downwardly through the cap 9 and through the plug 13 inserted in the upper end of the tubular portion 7 previously mentioned. By this arrangement the tension of the spring 10 can be regulated to ensure the desired resistance thereof to the fluid pressure on the head 6, in a manner that will be readily understood. A normally visible ring 14 slides up and down on the portion 7, with enough friction to enable it to hold itself in any adjusted position thereof. The arms 15 of the member 5 move up and down in the slots 8, and engage the lower edge of the ring 14, so that upward movement of the member 5 will cause the ring 4 to slide upward also. When the member 5 moves downward, the ring 14 will remain at the maximum height at which it was placed. Graduations 16, which are all normally visible, and which do not move at any time, may be provided on the outer surface of the portion 7, at each side of either one or both of the slots 8, so that the pressure in pounds will be recorded by the position in which the ring 14 remains after being pushed upward by fluid pressure in the engine.

Now there are different ways of using the pressure indicating and recording device shown and described, it will be understood, in connection with an internal combustion engine, or in connection with other kinds of apparatus employing fluid pressure, and more especially those in which the fluid pressure is variable. For example, in testing the pressure in an internal combustion engine, the tapered plug portion 1 may be screwed into the threaded socket ordinarily found on each cylinder of the engine, and the maximum pressure in the engine will be recorded by the position in which the ring 14 is left after being pushed upward. If it is desired to test, for example, the compression of each cylinder, it will only be necessary to take off the spark plug and insert the device in place thereof, and when the engine is operated the exact pressure developed by the compression stroke of the piston in the cylinder being tested will be recorded by the upward movement of the ring 14 in the manner explained. Of course, the device can be used for other purposes, and in various situations, but preferably in connection with machines or apparatus in which a variable pressure is developed, for in such case ordinary pressure recording devices are not suitable. An ordinary steam gage, for example, when placed on an internal combustion engine, will respond to the pressure therein, either the explosion or the compression, but the indicator of such a device will not record the maximum pressure, and will move back and forth in a manner that will make it difficult to observe any indication of pressure. The invention herein shown and described, however, is not only simple and inexpensive in form, and strong and reliable in use, but is also of such character that it reduces the testing proposition and the recording of the pressure to an absolute certainty, as the friction ring 14 will remain at the maximum height at which it may be placed by the variable pressure within the engine cylinder.

It will be seen, therefore, that the member 5 which is subject to pressure, and which is displaceable by the pressure, is entirely outside of the spring, so that the spring can be longer than this member. Thus the screw threaded plug body 1 encloses the member 5 and the lower portion of the spring. Also, the instrumentalities including the scale 16 and the displaceable indicating element 14 are entirely outside of said spring, whereby practically everything is external of said spring. In this way, the spring can be much longer than the tubular member 5, and the indicating element 14 can assume a normal position about midway between the opposite ends of the spring, so that the device as a whole is comparatively short and has upper and lower ends which are disposed a fixed distance apart, notwithstanding that the spring is of a liberal length to enable the indicating means to be of a satisfactory character, and to operate in a satisfactory manner. The graduations of the scale can be of a uniform character, or uniformly spaced, or substantially so, but with a shorter spring the graduations would have to be differently located, specially for the higher pressures. Therefore, with the construction shown and described, which is illustrative of one form of the invention, the piston 6 is connected externally of the spring with the element 14 and consequently it is not necessary to use anything inside of the spring or extending through the spring to connect the piston with the indicating element, and thus the indicating element may be normally located at any point between the opposite ends of the spring, and the spring may be of the length necessary or desirable for the purposes required, without employing devices which would give the device as a whole a variable height, and without objectionably lengthening or increasing the height of the device as a whole. In other words, the device as a whole is of fixed length, and is comparatively short, but at the same time the spring 10 is of a length and character to ensure practically uniform yielding resistance to the upward displacement of the piston 6, as a long open coil spring of the kind shown can be compressed to a greater extent than a shorter and stiffer spring, and affords a greater range of indicating displacement of the movable indicating element. The indicating means are normally entirely visible, as the entire length of the scale is visible at all times, and the sliding indicating element 14 is always visible, and the spring extends parallel with the scale, so that the element 14 is moved up and down along the length of the upper portion of the spring by the up and down displacement of the piston 6 which is subject to the pressure. Means are provided at the upper end of the body 1, as explained, to engage the upper end of the spring, so that the upper end of this spring is held stationary at a point adjacent the upper end of the scale, while the lower end of the spring is subject to compression by the upward movement of the piston.

Thus it will be seen that the tube 5 forms a guide and a receptacle for the spring 10, into which the spring is compressed by the upward movement of the tube, so that buckling of the spring while it is being compressed is prevented, as it is held against lateral displacement by the tube, as the latter moves upward. Thus, the greater the fluid pressure, the more the spring is accumulated into the tube 5, and compressed therein, practically the entire spring being compressed into the tube when the fluid pressure is great enough to force the ring 14 upward against the lower edge of the cap 9 at the top of the device.

What I claim as my invention is:—

1. In a pressure indicator, a body formed with a polygonal wrench engaging portion and an integral reduced upper portion, and with an externally threaded integral lower portion adapted to be screwed into an engine, having a bore in said polygonal and threaded portions, a fluid pressure inlet for the lower end of said bore, a tube slidable endwise in said bore, a piston head on the end of the tube adjacent said inlet, a compression spring in said tube, means at the top of said reduced portion to engage the outer end of said spring, whereby movement of the tube by the fluid pressure compresses the spring progressively into said tube, so that the tube forms a guide and receptacle into which the spring is accumulated by the compression thereof, means forming a scale, and indicating means disposed intermediate the opposite ends of the spring and having separable engagement with the open end portion of said tube, movable frictionally along said scale, adapted by friction to remain in indicating position when the fluid pressure is discontinued.

2. A structure as specified in claim 1, having a slot in said means to form the scale, said tube having a portion bent outward through said slot to engage said indicating means.

3. A structure as specified in claim 1, said means for engaging the outer end of the spring being adjustable to vary the tension of the spring.

4. A structure as specified in claim 1, said indicating means comprising a friction ring disposed substantially midway between the ends of the spring, so that normally about one half of the spring is in the tube and the other half outside.

5. A structure as specified in claim 1, the open end portion of said tube having a shoulder, and said body having a stop to engage said shoulder, thereby to limit the return motion of the tube by the expansion of said spring.

AUGUSTUS O. KAHLE.